(12) United States Patent
Cornu et al.

(10) Patent No.: US 9,958,070 B2
(45) Date of Patent: May 1, 2018

(54) MEMBRANE EDGE SEALING

(71) Applicant: VELCRO BVBA, Deinze (BE)

(72) Inventors: Frederic Cornu, Boutigny Prouais (FR); Carlos Sáez Comet, Barcelona (ES); Fabio Billa Longo, Barcelona (ES)

(73) Assignee: Velcro BVBA (BE)

( * ) Notice: Subject to any disclaimer, the term of this patent is extended or adjusted under 35 U.S.C. 154(b) by 109 days.

(21) Appl. No.: 14/974,353

(22) Filed: Dec. 18, 2015

(65) Prior Publication Data
US 2017/0175896 A1 Jun. 22, 2017

(51) Int. Cl.
F16J 15/02 (2006.01)
F16J 15/04 (2006.01)

(52) U.S. Cl.
CPC ..................... F16J 15/04 (2013.01)

(58) Field of Classification Search
CPC ..... F16J 15/04; E04D 1/28; E04D 1/14–1/21; E04D 13/1681; E04B 1/68; Y10T 24/27; Y10T 24/2708; Y10T 24/2717; Y10T 24/2725; Y10T 24/2733; Y10T 24/2742; Y10T 24/2775; Y10T 24/2783; A44B 18/0069; A44B 18/0023; A44B 18/0073
USPC .......................................................... 277/312
See application file for complete search history.

(56) References Cited

U.S. PATENT DOCUMENTS

| 5,200,245 | A | * | 4/1993 | Brodrick, Jr. ...... | A44B 18/0069 24/304 |
| 5,672,404 | A | * | 9/1997 | Callahan, Jr. ...... | A44B 18/0073 128/DIG. 15 |
| 5,691,026 | A | * | 11/1997 | Zinke ................. | A44B 18/0003 24/306 |
| 6,205,623 | B1 | * | 3/2001 | Shepard ............. | A44B 18/0049 24/30.5 R |

(Continued)

FOREIGN PATENT DOCUMENTS

EP 1002846 4/2004
EP 2191755 6/2010

(Continued)

OTHER PUBLICATIONS

International Search Report and Written Opinion in International Application No. PCT/EP2016/077533, dated Feb. 22, 2017, 10 pages.

*Primary Examiner* — Nathan Cumar
(74) *Attorney, Agent, or Firm* — Fish & Richardson P.C.

(57) ABSTRACT

An edge of a moisture barrier membrane, such as of a roof assembly, is attached and sealed using a moisture-impermeable sealing tape. The membrane has a fibrous surface and a non-fibrous surface. The tap is secured to a surface to which the edge of the membrane is to be attached, and positioned to underlie and extend along the edge of the membrane. The tape has a first edge width carrying a field of discrete touch fastener elements, and a second edge width carrying a layer of adhesive. The fibrous surface of the moisture barrier membrane is engaged against the field of (Continued)

touch fastener elements, such that the moisture barrier membrane overlaps the first edge width of the tape, and then the sealing tape is folded over the edge of the moisture barrier membrane, such that the adhesive engages the non-fibrous surface of the moisture barrier membrane.

18 Claims, 10 Drawing Sheets

(56) References Cited

U.S. PATENT DOCUMENTS

| | | | |
|---|---|---|---|
| 6,223,400 B1 * | 5/2001 | Lenack | B65D 5/0236 229/125.01 |
| 6,692,149 B2 * | 2/2004 | Baker | B65D 33/1691 383/203 |
| 8,329,275 B2 | 12/2012 | Deiss | |
| 8,549,714 B1 | 10/2013 | Shepard et al. | |
| 8,562,769 B2 | 10/2013 | Kraus et al. | |
| 2002/0023321 A1 * | 2/2002 | Clune | A44B 18/0049 24/306 |
| 2007/0261579 A1 | 11/2007 | Rizika | |
| 2010/0166527 A1 | 7/2010 | Hill | |

FOREIGN PATENT DOCUMENTS

| | | |
|---|---|---|
| EP | 2592196 | 10/2014 |
| WO | WO 98/36139 | 8/1998 |
| WO | WO 01/67912 | 9/2001 |
| WO | WO 01/81771 | 11/2001 |
| WO | WO 2004/058584 | 7/2004 |
| WO | WO 2006/108049 | 10/2006 |

* cited by examiner

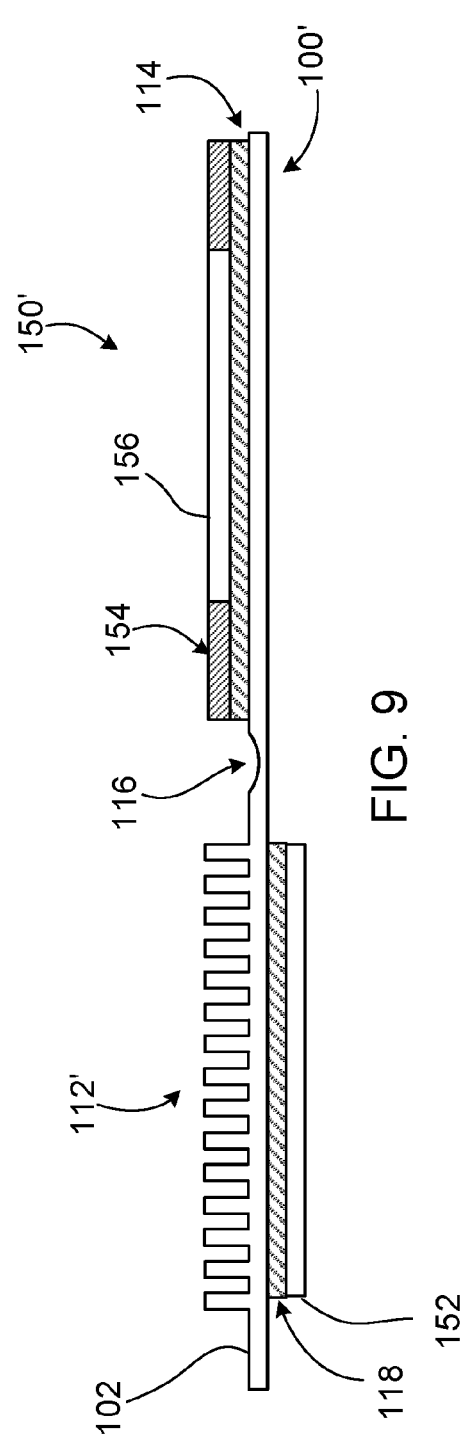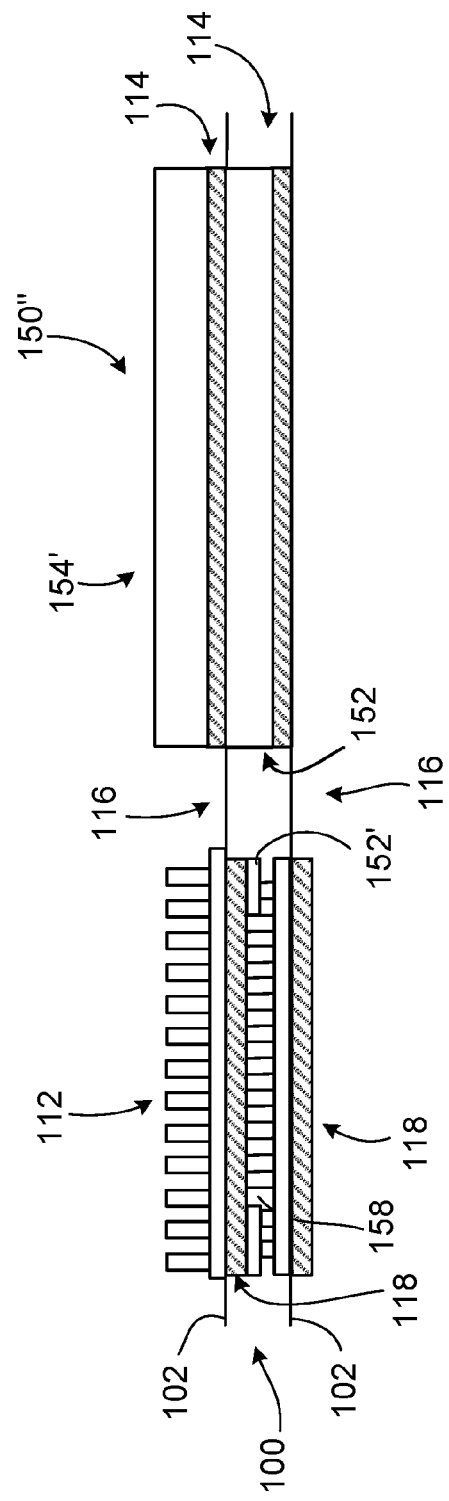

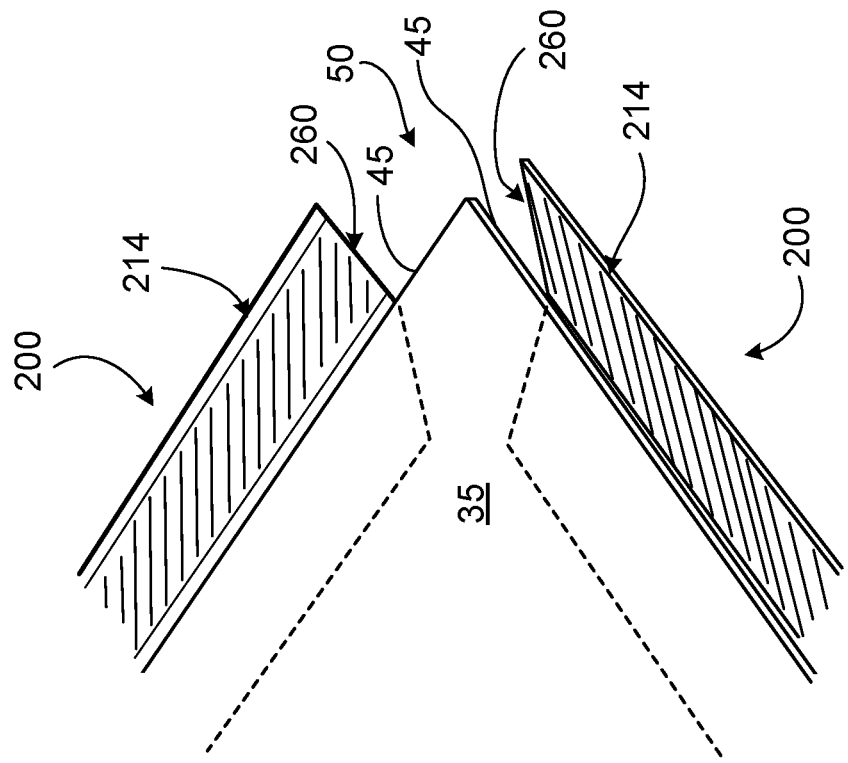
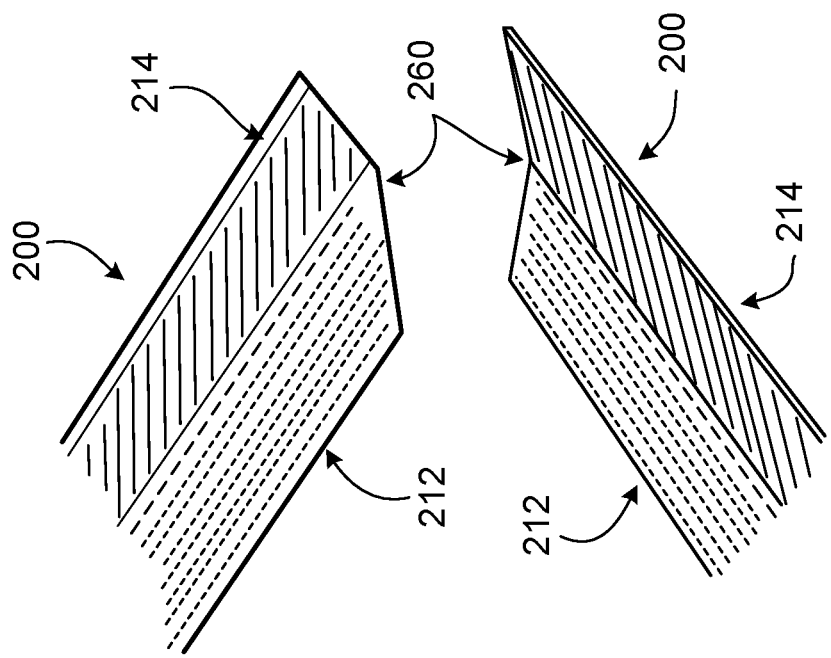
FIG. 11A
FIG. 11B

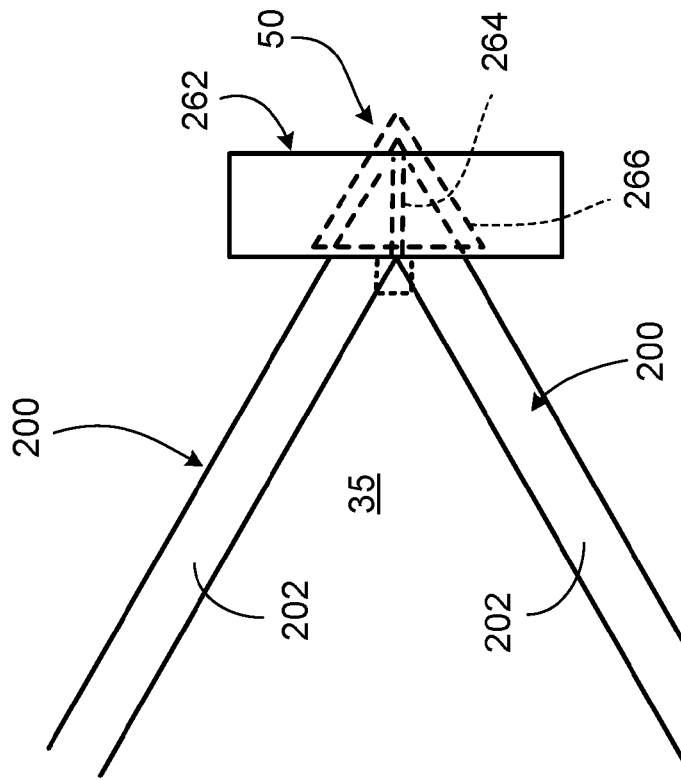
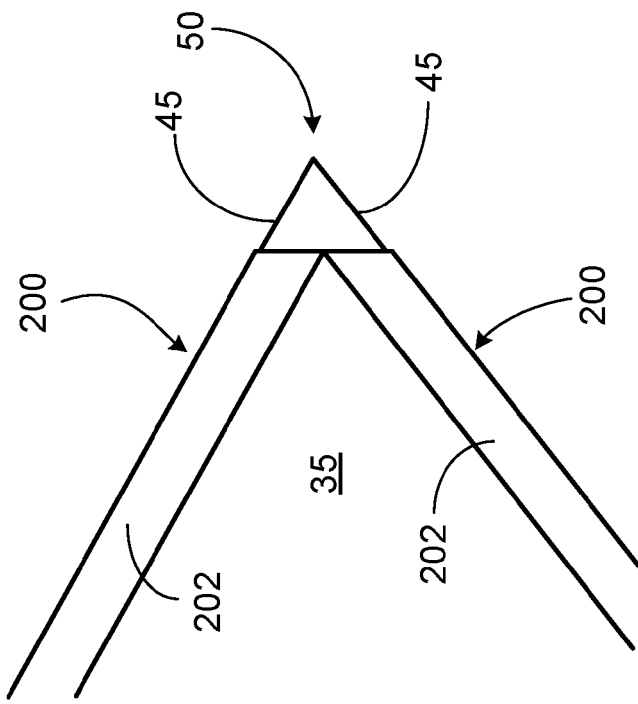

MEMBRANE EDGE SEALING

TECHNICAL FIELD

This invention relates to sealing edges of membranes, and more particularly to connecting and sealing edges of moisture barrier membranes having a fibrous surface.

BACKGROUND

Membranes, such as moisture barrier membranes, are often necessary to prevent, or at least greatly inhibit, a flow of moisture or other fluid, in some cases gas, from one side of the membrane to the other. In the context of building construction, moisture barrier membranes may be installed in a roofing structure, or in wall construction, to control moisture propagation. Such barrier membranes are often provided as large sheets or on rolls, and are cut on the job site. Some membranes, such as the Vario KM Duplex UV moisture-adaptive smart vapor retarder, have a fleece backing on one side. To cover a wide area it may be necessary to join adjacent courses of such a membrane along a seam, such as an overlapping seam. Various means of sealing such a seam are available, such as adhesive tapes or sealants. Sealing the edges of fleece-backed membranes can be difficult, due to the presence of the porous fleece. Improvements and alternatives in securing and sealing edges of such membranes, either to adjacent membrane surfaces or to other adjacent structures, are sought.

SUMMARY

The invention features a sealing product and associated method which employs a flexible sealing tape carrying on the same side both a field of discrete touch fastener elements, such as hooks, along one half of the tape, and a layer of adhesive on the other half of the tape. The touch fastener elements engage against a hook-engageable (e.g., fleece) side of the membrane, and is folded about the edge of the membrane to engage the opposite side of the membrane with the adhesive.

One aspect of the invention features a sealing tape having a flexible base film of greater length than width and impervious to moisture. By 'film' we do not mean to exclude impregnated paper and other moisture-impermeable sheets. The film has opposite broad faces including an upper face and a lower face. A field of discrete touch fastener elements is disposed on the upper face of the film, each touch fastener element shaped to releasably snag fibers. The field of discrete touch fasteners extends along a first edge width of the upper face, leaving a second, opposite edge width of the upper face void of touch fastener elements. By 'edge width' we mean a portion of the overall width of the product that is closer to one longitudinal edge of the tape than the other. An edge width may be relatively narrow or wide. A first layer of adhesive, such as a pressure-sensitive adhesive, is disposed on the second edge width of the upper surface of the film and spaced from the field of touch fastener elements, such that the upper face of the film has a longitudinal fold region spaced from its edges, between the field of fastener elements and the first layer of adhesive.

In some embodiments the tape has a second layer of adhesive disposed on the lower face of the film, directly under the field of touch fastener elements. Preferably the second layer of adhesive directly underlies at least 80% of the field of fastener elements, and the tape may include a removable release liner covering the second layer of adhesive. In some cases the release liner defines apertures through which discrete regions of the first layer of adhesive are exposed for releasable adherence to the touch fastener elements with the sealing tape rolled for transport.

The first and second opposite edge widths of the tape each preferably cover more than 40% of an overall width of the upper face of the base film.

In some constructions, the upper face of the film and the discrete touch fastener elements comprise respective portions of a single, contiguous mass of a resin. Such a construction can be manufactured by continuous roll-molding of the film and fastener elements from a single resin, for example.

In some embodiments, the tape has a removable release liner covering the first layer of adhesive. In some case, the release liner defines apertures through which discrete regions of the first layer of adhesive are exposed for releasable adherence to the touch fastener elements with the sealing tape folded for transport.

For some applications, the field of discrete fastener elements is continuous along the length of the film. Alternatively, the field may be broken into separate patches of discrete fastener elements separated longitudinally by element-free regions of the film.

In some cases, the discrete fastener elements have stems extending from a base to a distal head having two oppositely directed crooks or a single, laterally directed crook. In another example, each of the fastener elements is mushroom-shaped.

For some applications, such as for engaging thin fleece membrane backings, the discrete fastener elements are preferably less than 0.4 mm in height. Preferably, the film has an overall thickness in the fold region of less than about 0.1 mm, or even less than 0.05 mm, yet is sufficiently durable to not split upon installation.

The tape may be configured as a roll of tape having overlapping courses, such as for transport to a work site. The tape may be cut to length for use.

Another aspect of the invention features a method of attaching and sealing an edge of a moisture barrier membrane having opposite surfaces including a fibrous surface and a non-fibrous surface. The method includes securing a moisture-impermeable sealing tape to a surface to which the edge of the moisture barrier membrane is to be attached, with the tape positioned to underlie and extend along the edge of the membrane when attached and having a first edge width in which a field of discrete touch fastener elements is disposed, and a second edge width carrying a layer of adhesive. The fibrous surface of the moisture barrier membrane is then engaged against the field of touch fastener elements, such that the moisture barrier membrane overlaps the first edge width of the tape, and then the sealing tape is folded over the edge of the moisture barrier membrane, such that the adhesive engages the non-fibrous surface of the moisture barrier membrane.

In some examples, engaging the fibrous surface of the moisture barrier membrane against the field of touch fastener elements leaves the second edge width exposed beyond the edge of the moisture barrier membrane.

In some cases the method further includes, after engaging the fibrous surface of the moisture barrier membrane against the field of touch fastener elements and before folding the sealing tape over the edge of the moisture barrier membrane, trimming the moisture barrier membrane to have an edge disposed between the first and second edge widths of the sealing tape.

In some examples, securing the sealing tape to a surface to which the edge of the moisture barrier membrane is to be attached includes securing the sealing tape to a non-fibrous surface of another moisture barrier membrane.

In some cases, securing the sealing tape to a surface to which the edge of the moisture barrier membrane is to be attached includes adhering the sealing tape to the surface to which the edge of the moisture barrier membrane is to be attached, sometimes first removing a release liner from a back side of the sealing tape to expose a second layer of adhesive.

Some examples of the method include, after engaging the fibrous surface of the moisture barrier membrane against the field of touch fastener elements and before folding the sealing tape over the edge of the moisture barrier membrane, repositioning the moisture barrier membrane by disengaging the fibrous surface from the touch fastener elements and then reengaging the touch fastener elements with the fibrous surface in a different position.

In some cases, after engaging the fibrous surface of the moisture barrier membrane against the field of touch fastener elements and before folding the sealing tape over the edge of the moisture barrier membrane, a release liner is removed from the second edge width of the sealing tape to expose the layer of adhesive.

Various embodiments and configurations of the invention can provide an efficient means of securing and sealing a membrane edge, and can be implemented without the need of separate sealants or the handling of tacky materials. Furthermore, repositioning and de-wrinkling of the membrane before final installation is facilitated due to the releasable nature of the hook-loop interface. The sealing tape can be provided as a single, composite rolled tape that provides all of the necessary securing and sealing functions.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 9 is a cross-sectional end view of a first example sealing tape with release liners;

FIG. 10 is a cross-sectional end view showing two adjacent courses of sealing tape in a roll;

FIGS. 11A-11D sequentially illustrate a method of sealing adjacent edges and a corner region of a moisture barrier membrane.

In certain instances, like reference symbols in the various drawings may indicate like elements.

DETAILED DESCRIPTION

Figure 1:
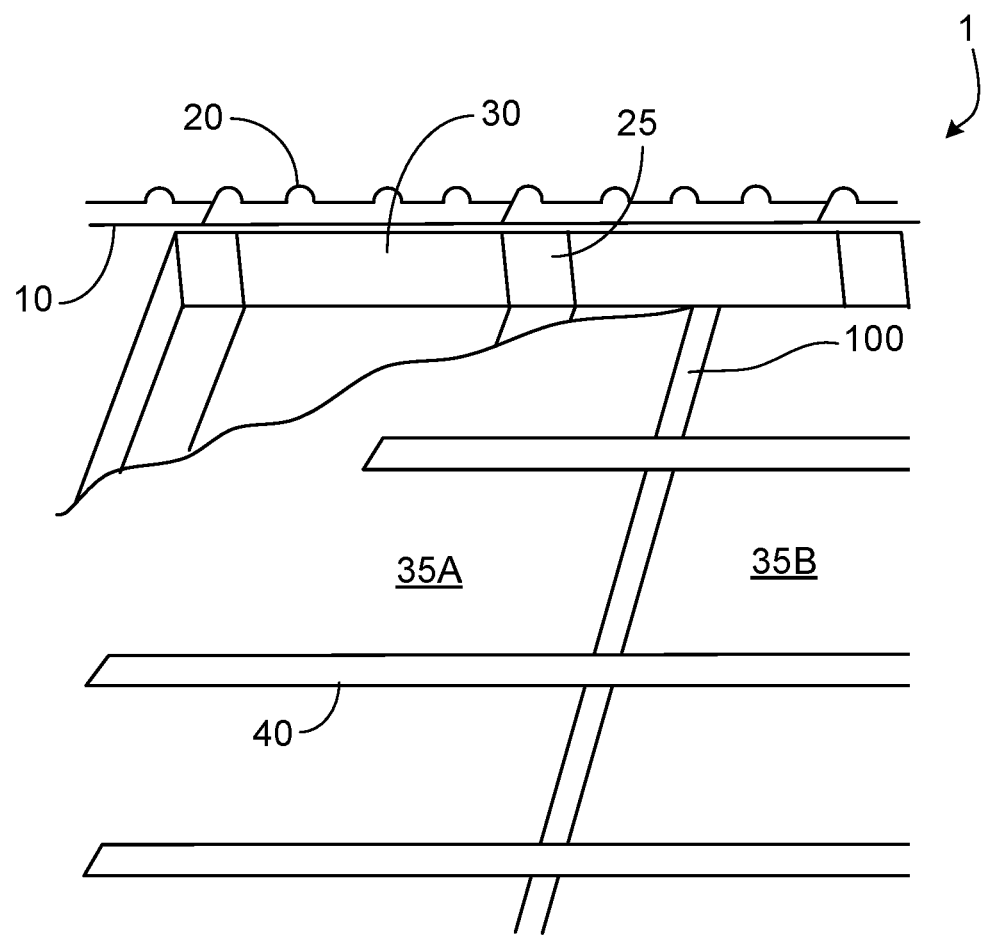
FIG. 1 is a perspective view of an example roofing system including a sealing tape in accordance with one or more embodiments of the present disclosure.

Referring first to FIG. 1, an example roofing system 1 for enclosing the top portion of a building includes an underlayment 10 carrying a roofing panel 20 on a network of joists 25. Sections of insulation 30 (e.g., thermal insulation material, such as cellulose, glass wool, rock wool, polystyrene, urethane foam, etc.) are fitted between the joists 25 to inhibit heat transfer between the interior and exterior of the building. Broad sheets of moisture barrier membrane 35A and 35B are positioned to cover the pattern of joists 25 and insulation sections 30. The membrane sheets 35A and 35B are designed to inhibit or prevent moisture propagation between the exterior and the interior of the building. A length of sealing tape 100 binds the edges of the adjacent membrane sheets 35A and 35B, coupling the sheets together along a moisture-impermeable seam. Support struts 40 extend across the insulation sections 30 and the sheets of moisture barrier membrane 35A and 35B to secure them in place against the joists 25.

Figure 2A:
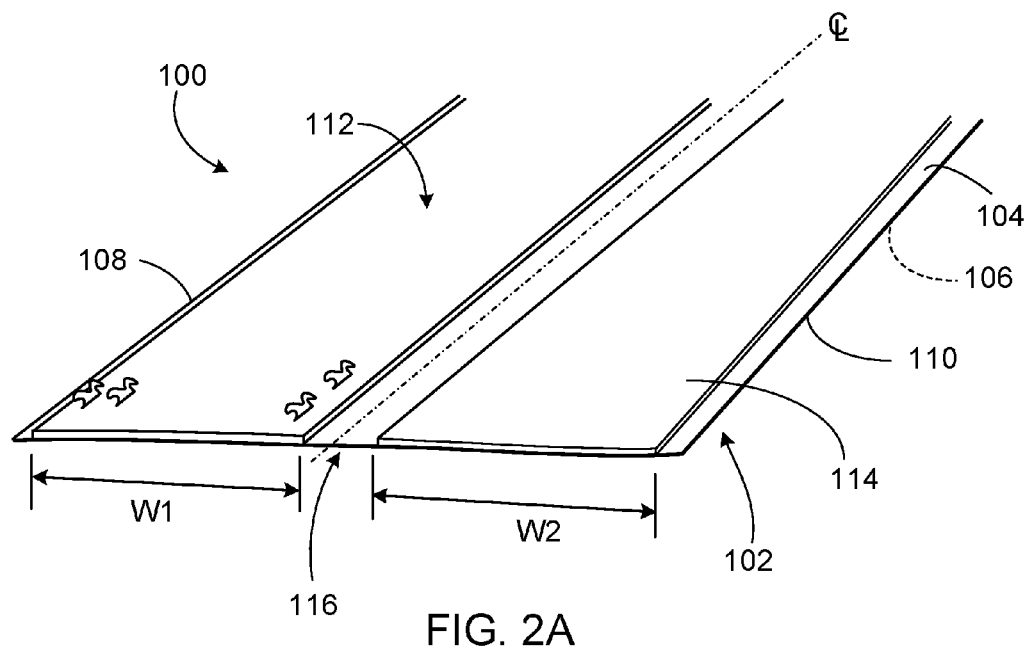
FIGS. 2A and 2B are perspective and side views the sealing tape of FIG. 1.
Figure 2B:
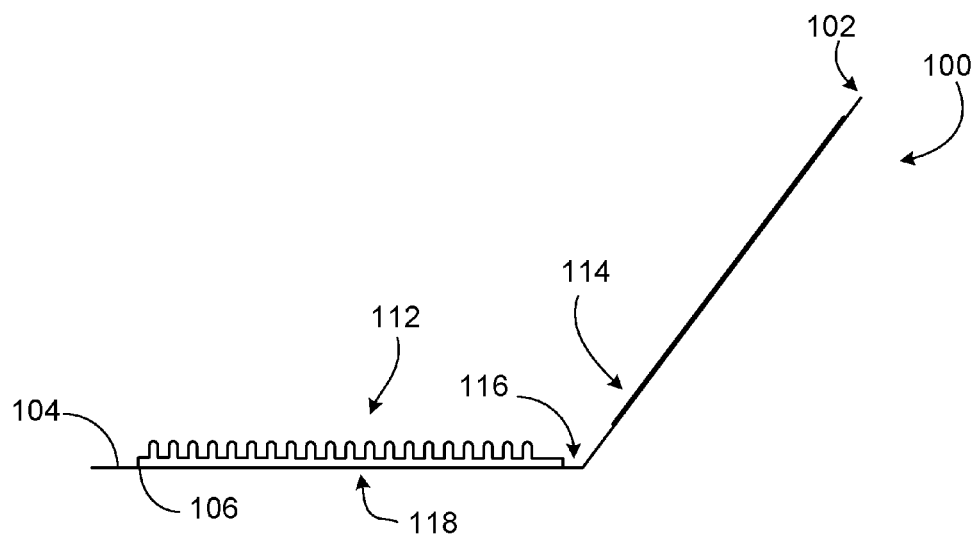

As shown in FIGS. 2A and 2B, the sealing tape 100 includes an elongated (e.g., having greater length than width) base film 102 having a broad upper face 104 and an opposite broad lower face 106 bounded by first and second longitudinal edges 108,110. The base film 102 is impervious to moisture. For example, the base film may include one or more layers of a liquid impervious material and/or include a hydrophobic coating that repels liquid. A field of discrete touch fastener elements 112 is disposed on the film's upper face 104 proximate the first longitudinal edge 108. For example, the fastener element field 112 may be bonded (permanently or releasably) to the base film or integrally formed with the base film 102 as a single, contiguous mass of resin. As described in detail below, the touch fastener elements included in the field 112 are shaped to releasably snag fibers on the fibrous surface of a moisture barrier membrane (see e.g., FIGS. 3A-5B and 7A-7C, and related discussion). The fastener element field 112 extends in both the lengthwise and widthwise directions of the base film 102, although for ease of illustration only a few discrete fastener elements 134 are shown in FIG. 2A. In this example, the fastener element field 112 extends along substantially the entire length of the film 102. The fastener element field 112 is continuous in the lengthwise direction of the film 102, meaning that the pattern of individual fastener elements is uninterrupted, though it may vary in terms of density. As shown, the fastener element field 112 extends along a limited first edge width "W1" of the film's upper face 104, from the edge 108 towards a centerline "CL" of the base film 102, leaving a second, opposite second edge width "W2" of the upper face 104 void of touch fastener elements (see FIG. 2A). A first layer of adhesive 114 is disposed on the film's upper face 104 proximate the second longitudinal edge 110 along the second edge width. The first adhesive layer 114 is compatible with (e.g., designed to adhere to) the non-fibrous surface of a moisture barrier membrane (see e.g., FIGS. 7A-7C) to form a moisture-impermeable bond. In some examples, the first adhesive layer 114 is provided as a non-reactive adhesive, such as a pressure sensitive adhesive. In some examples, the adhesive is "reusable"—that is, it can maintain significant adhesive strength through multiple cycles of attachment and detachment from the non-fibrous surface of the moisture barrier membrane. Similar to the fastener element field 112, the first adhesive layer 114 extends along substantially the entire length of the film 102, yet only along the second edge width of the film's upper face 104, from the edge 110 towards the film's centerline CL. In this example, the first and second edge widths W1,W2 are depicted as being of similar size in the widthwise direction. However, in various other implementations, the relative widths of the fastener element fields and adhesive layers may differ, such as when the particular surfaces to which the fastener elements and adhesive are to attach, respectively, require different engagement areas for effective holding or sealing. In some examples, the first and/or second edge width encompass more than 40% of the overall width of the film's upper face 104.

The fastener element field 112 and the first adhesive layer 114 are laterally spaced apart from one another on the film's upper face 104, such that a bare region of the flexible base film 102 provides a longitudinal fold region 116. As shown in FIG. 2B, the fold region 116 forms a hinge permitting the second edge width portion of the film 102 carrying the first adhesive layer 114 to fold inward towards the first edge width portion of the film. In one example, the base film 102 is made of polypropylene and has an overall thickness of in fold region 116 of less than about 0.1 mm, or less than 0.05 mm, such that the film readily yields to the force of the user. In this example, sealing tape 100 further includes a second layer of adhesive 118 disposed on the film's lower face 106, directly under the fastener element field 112. The second adhesive layer 118 extends along substantially the entire length of the film 102, yet not beyond the fold region 116. Preferably, the second adhesive layer 118 directly underlies at least 80% of the fastener element field 112.

In the example depicted in FIGS. 2A and 2B, the touch fastener elements of the field 112 are "palm tree" type hooks. However, numerous types of the touch fastener elements designed for releasably snagging or otherwise engaging fibers may be used. For example, FIGS. 3A-5B illustrates various types of suitable hook-type touch fastener elements, including palm tree and J-hooks. Still various other types of suitable touch fastener elements (such as trilobal hooks or mushroom-type touch fastener elements) may be incorporated in various implementations of the sealing tape described in the present disclosure.

Figures 3A, 3B:
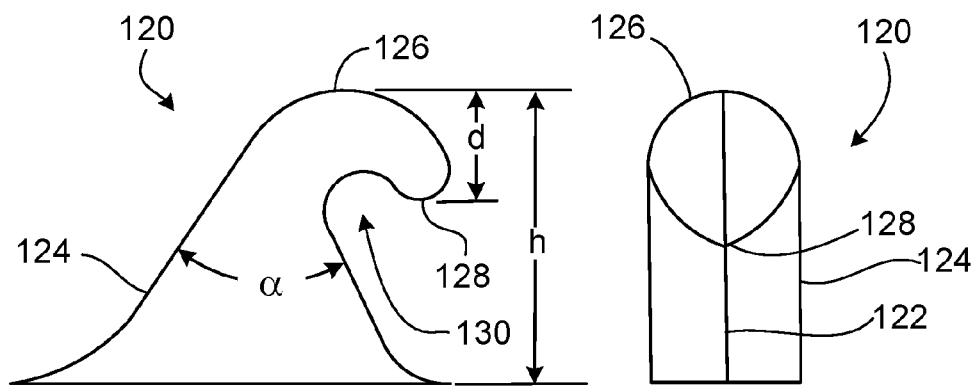
FIGS. 3A and 3B are side and end views of a first J-shaped hook.
Figures 4A, 4B:
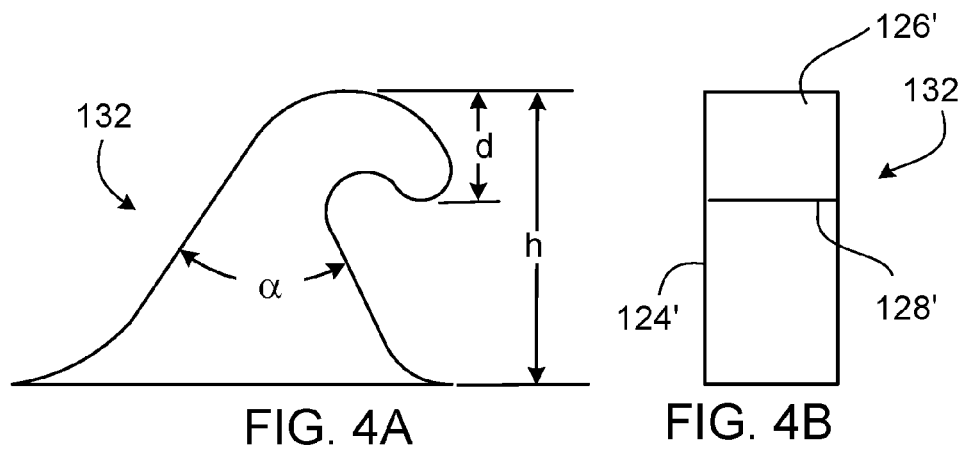
FIGS. 4A and 4B are side and end views of a second J-shaped hook.
Figures 5A, 5B:
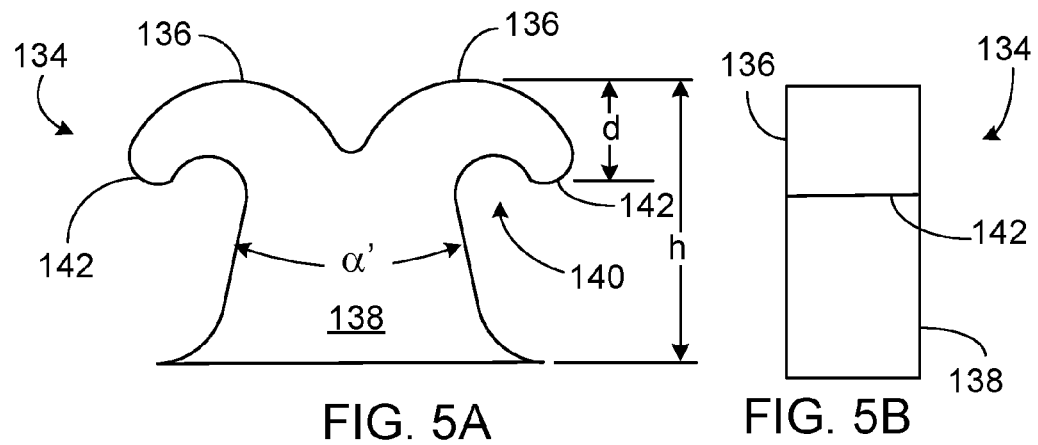
FIGS. 5A and 5B are side and end views of a first palm tree shaped hook.
Figure 5C:
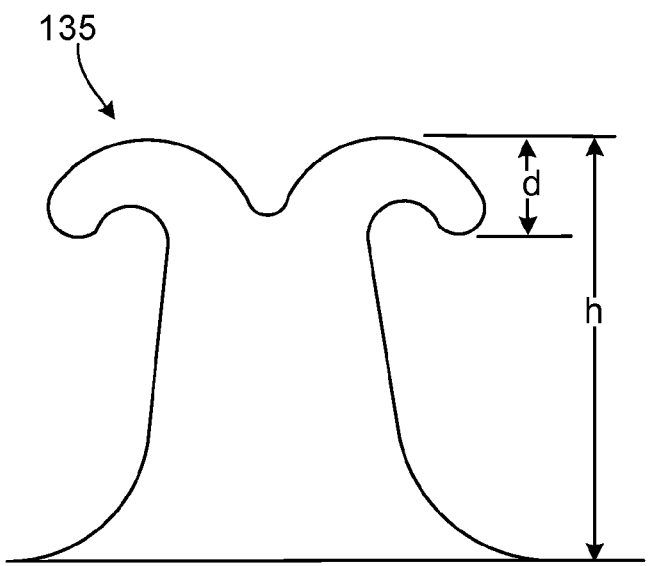
FIG. 5C is a side view of a second palm tree shaped hook.
Figure 6:
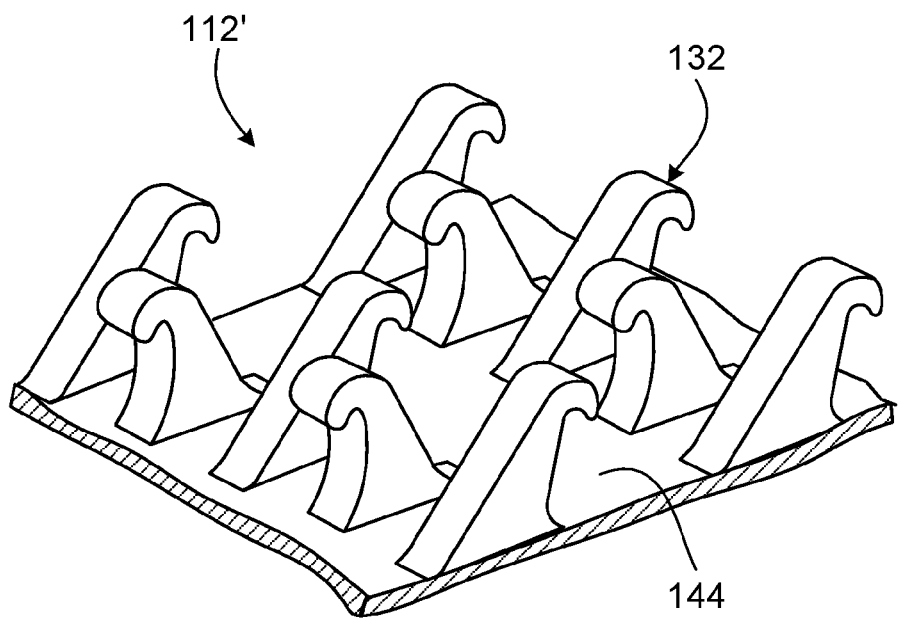
FIG. 6 is a perspective view of a field of J-shaped hooks.

The hook 120 of FIGS. 3A and 3B has a J-shaped profile and curved sides, such as may be molded in a cavity formed between two adjacent mold plates in a mold roll employed in the Fischer process described in U.S. Pat. No. 4,794,028, leaving a parting line 122 down the middle of the hook at the interface between the two mold plates. The pedestal stem portion defines a rather large included angle α (e.g., about 61.5 degrees) between front and rear edges. The head portion 126 has a re-entrant tip 128, meaning that it extends downward toward the base of the hook to form a concave crook 130 for trapping fibers presented on the fibrous surface of a moisture barrier membrane. The tip 128 extends downward to a distance "d" from the most upper surface of the hook, and the entire hook has an overall height "h", as measured normal to the base. The hook 132 of FIGS. 4A and 4B also has a J-shaped profile, but has flat sides as seen in FIG. 4B. Thus, its tip 128' extends completely across the hook, and the upper surface of its head portion 126' presents a rather broad surface to the mating material. The stem portion 124' defines the same included angle α, the tip 128' also extends down to a distance "d", and the hook 132 also has an overall height "h". FIG. 6 illustrates a portion of example fastener element field 112' featuring an configuration of J-hooks 132 arranged in alternating rows where the tips 128' overhang the base 144 in opposite, parallel directions. The hook 134 of FIGS. 5A and 5B (and the hook 135 of FIG. 5C) has a palm tree shaped profile, as seen in FIG. 5A (see also FIG. 2A). As such, it has two head portions 136 that extend from a common stem portion 138 to overhang the base in opposite directions, defining two discrete, and oppositely directed, fiber-trapping crooks 140. In this case, stem portion 138 defines an included angle α' (e.g., about 24.5 degrees) between front and rear edges. The tips 142 extend down to a distance "d", and the hook 134 also has an overall height "h". We have found that the above-described hook shapes perform particularly well directly (i.e., without any added loop material) engaging and releasably fastening to the fibrous surface of commercially used moisture barrier membranes (e.g., the fleece backing of the Vario KM Duplex UV moisture-adaptive smart vapor retarder) when the overall height of the hook is less than about 0.40 mm (e.g., about 0.38 mm or about 0.30 mm) and the downward extension "d" of the tip(s) is less than about 0.15 mm (e.g., about 0.14 mm or about 0.07 mm).

Figure 7A:
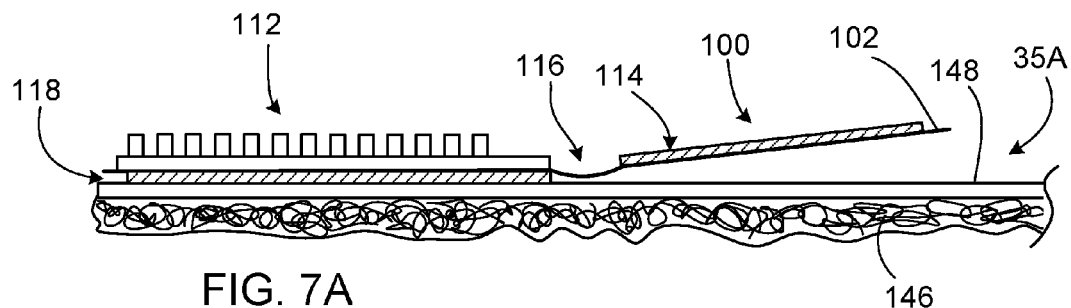
FIGS. 7A-7C sequentially illustrate a method of attaching and sealing an edge of a moisture barrier membrane using the sealing tape of FIGS. 2A and 2B.
Figure 7B:
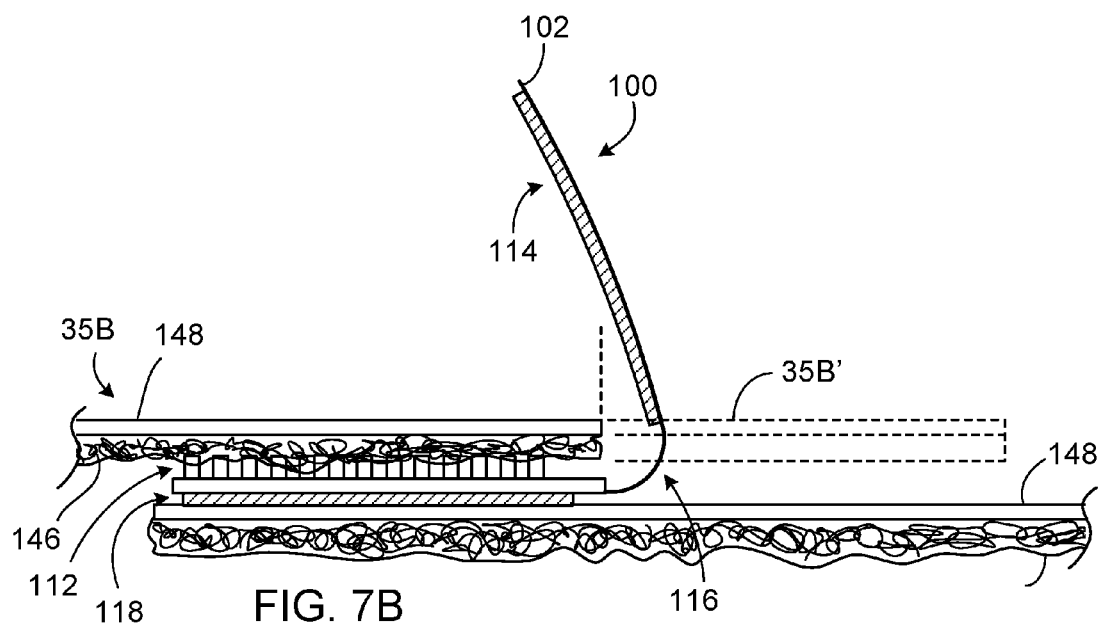
Figure 7C:
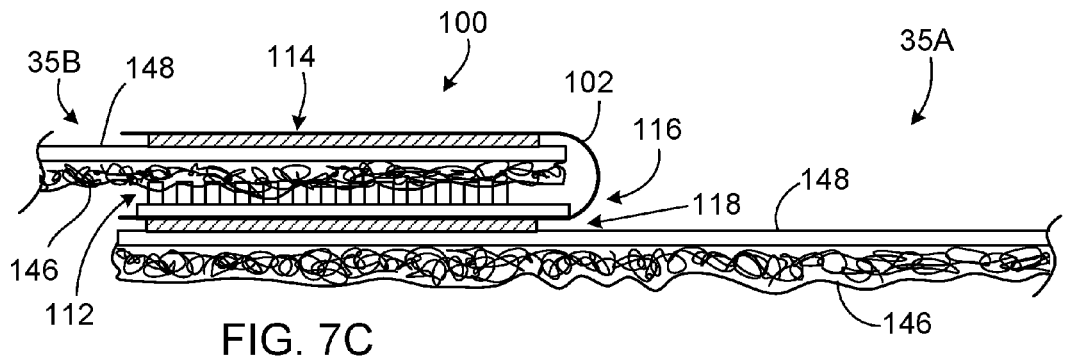

FIGS. 7A-7C illustrate a method of attaching and sealing an edge of a moisture barrier membrane using the sealing tape 100 described above. In this example an edge region of a first membrane sheet 35A is being secured to and sealed against an edge region of a second membrane sheet 35B. Each of the first and second membrane sheets 35A,35B includes a fibrous surface 146 and a non-fibrous surface 148. As shown in FIG. 7A, the sealing tape 100 is initially secured to the non-fibrous surface 148 of the first membrane sheet 35A along its edge region, with the edge carrying the first adhesive 114 inboard and free to be folded. In this example, the second adhesive layer 118 of the sealing tape 100 adheres the tape to the non-fibrous surface 148. Thus, the sealing tape is oriented such that the fastener element field 112 and the first adhesive layer 114 disposed on the base film's upper face 104 are facing outwardly from the first membrane sheet 35A and exposed for engagement with the surfaces of the second membrane sheet 35B. Further, because the second adhesive layer 118 is disposed directly under the fastener element field 112 on the film's lower face 106, the fastener element field 112 on the film's first edge width is held fixed relative to the first membrane sheet 35, while the film's second edge width carrying the first adhesive layer 114 is allowed to freely pivot along the fold region 116.

Next, as shown in FIG. 7B, the second membrane sheet is positioned with its edge overlapping the exposed fastener element field 112, which causes the individual fastener elements to releasably snag or otherwise engage loose fibers of the second membrane sheet's fibrous surface 146 on contact or with low contact pressure. The second edge width of the base film 102 carrying the first adhesive layer 114 remains exposed beyond the edge region of the second membrane sheet 35B. In the condition shown in FIG. 7B, the first membrane sheet 35A is releasably attached to the second membrane sheet 35B via the fastener element field 112. Thus, if the sheets are not aligned properly, a user can readily disengage and reposition the second membrane sheet, reengaging the fastener element field 112 with the fibrous surface 146 in a desired alignment before permanently securing the seam. Further, as illustrated by the dotted lines in FIG. 7B, a user may use the sealing tape as a guide to trim a portion 35B' of the second membrane sheet 35B after engaging the fastener element field 112 with the fibrous surface 146, thereby creating an edge of the second membrane properly positioned between the first and second edge widths of the sealing tape base film 102. With the fastener elements of the sealing tape holding the relative positioning of the two membrane sheets, as shown in FIG. 7C, the second edge width of base film 102 is folded over the edge region of the second membrane sheet 35B via the fold region 116, and pressed down against the non-fibrous surface 148 to bond the first adhesive layer 114 to the second membrane sheet, sandwiching the edge region of the second membrane sheet 35B between the fastener element field 112 and the first adhesive layer 114. The first adhesive layer 114 adheres to the non-fibrous surface 148, creating a liquid-impervious seal between the respective edges of the first and second membrane sheets 35A,35B.

While the description of FIGS. 7A-7C discusses sealing two adjacent membrane sheets, sealing tape 100 is also useful to seal the edge of a membrane sheet to other adjacent structure, such as a wooden roofing member, or a wall surface, or any other surface with which the membrane sheet is to form a seal and which can be adhered to by a suitable adhesive on the back side of the sealing tape. For non-smooth surfaces such as bare wood, a thicker adhesive layer, or perhaps a separate adhesive material such as hot-melt, acrylic or polyurethane adhesive or an epoxy, may be employed. Also, in some cases sealing tape 100 does not have an adhesive layer on its back surface, but instead is bonded to another surface by other means. For example, for installations requiring significant membrane sheet seaming sealing tape 100 may be pre-bonded to one edge of the membrane sheet in advance, such as by welding of the tape film 102 to resin of the non-fibrous surface of the membrane sheet.

Figure 8:
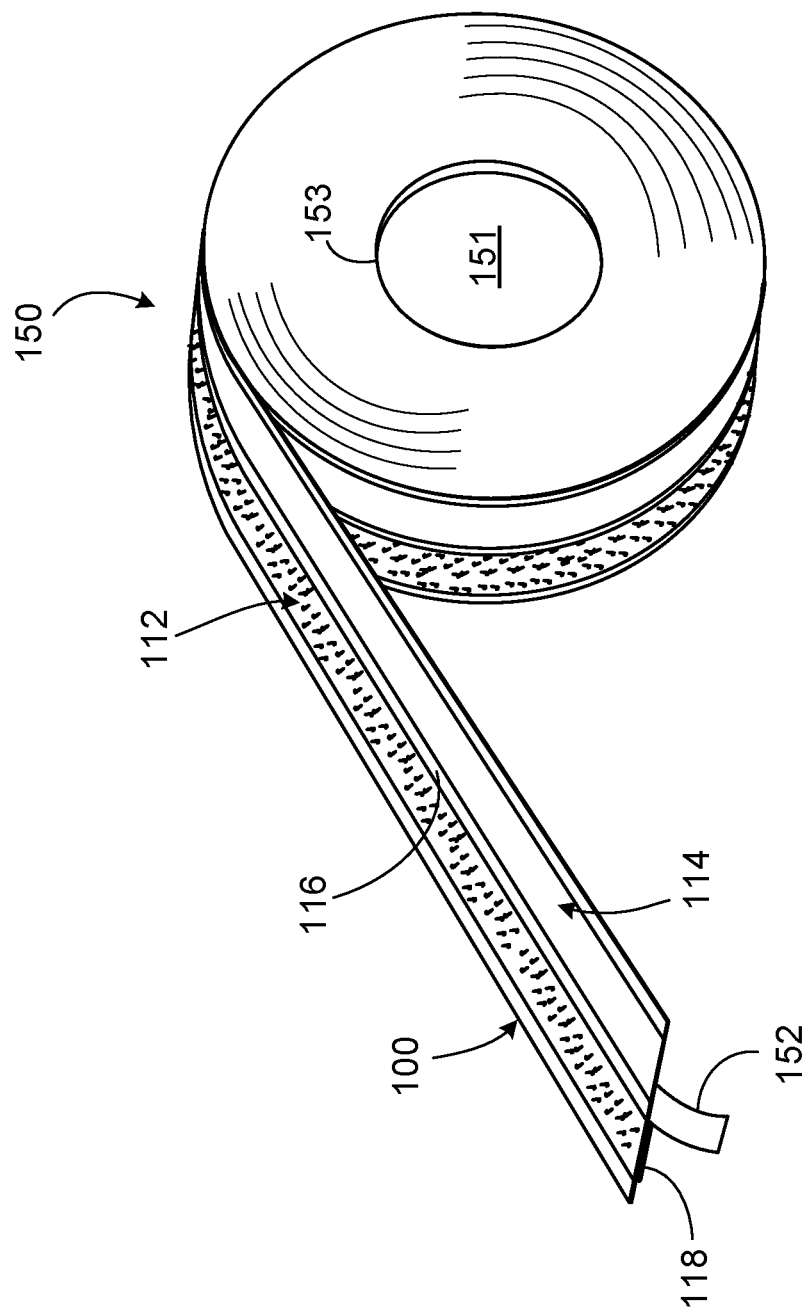
FIG. 8 is a perspective view of a roll of sealing tape incorporating a release liner between courses of the tape

Referring next to FIG. 8, sealing tape 100 can be provided as a roll 150 of tape having overlapping tubular courses, which define a core 151 supported on a spindle 153. In this example, the tape roll 150 includes a removable release liner 152 covering the second adhesive layer 118 between adjacent courses, which shields the fastener element field 112 of one course from the adhesive layer 118 of the next course. FIG. 9 illustrates a single course of an example tape roll 150' including a first release liner 152 covering the second adhesive layer 118, as well as a second release liner 154 covering the first adhesive layer 114. The release liner 154 defines a pattern of apertures 156, which expose discrete regions of the first adhesive layer 114. In this example, a length of the sealing tape 100' (which includes the fastener element field 112 formed as a single, contiguous mass of resin with the base film 102) can be removed (e.g., cut) from the roll 150' and folded over, with the discrete regions of the first adhesive layer 114 releasably adhering to various touch fastener elements of the field 112, which allows the sealing tape 100 to be transported in a folded configuration with the adhesive layers shielded. Alternatively, the apertures 156 in release liner 154 can be sized to allow discrete regions of adhesive layer 114 to temporarily bond against the back surface of an overlying course of the sealing tape in the roll, to provide just enough adherence to keep the tape in rolled form.

FIG. 10 illustrates two adjacent courses of an example tape roll 150" including a first release liner 152' covering the second adhesive layer 118 and a second release liner 154' covering the first adhesive layer 114. Here, the first release liner 152' defines a pattern of apertures 158 exposing discrete regions of the second adhesive layer 118 for releasable adherence to the tops of various touch fastener elements of the field 112 to hold the sealing tape 100 in the rolled configuration. In the examples illustrated in FIGS. 9-10, the first release liner 152 is removed to expose the second adhesive layer 118 prior to securing the sealing tape to a surface to which the edge of a moisture barrier membrane is to be attached, and the second release liner 154 is removed to expose the first adhesive layer 114 prior to folding the sealing tape over the edge of the moisture barrier membrane.

FIGS. 11A-11D illustrate a method for sealing two edges of a moisture barrier membrane at a corner using two pieces of sealing tape 200 and a strip of liquid-impervious corner tape 262. Tape 200 is essentially of the same structure as the sealing tape 100 shown in FIGS. 2A and 2B. Sealing tape 200 includes a field of fastener elements 212 and a first layer of adhesive 214 disposed on the upper surface of a base film and extending along opposing edge widths (see FIG. 11A). First, two lengths of sealing tape 200 are first bonded to the support surface to which the membrane is to be sealed, positioned to align with the edges of the membrane on opposite sides of a membrane corner. The ends 260 of sealing tape 200 nearest the corner are cut on a bias of about 45 degrees to the length of the tape, such as by removing the tape from a roll via a diagonal cut. The sealing membrane is then placed over the touch fastener element fields of the two tapes, as shown in FIG. 11B, with the corner exposed. The tape release liners are removed and the adhesive portions folded over the edges of the membrane and bonded to the exposed membrane surface, as shown in FIG. 11C. The biased ends 260 of the respective pieces of sealing tape 200 result in a triangular corner region 50 of the membrane sheet 35 remaining exposed. This exposed corner region 50 is then completely covered by a single strip of adhesive 262, effectively sealing the corner of the membrane.

Alternatively, the adhesive half of the ends of the tape sections can be cut on a bias in the opposite sense, such that as folded over the membrane 35 the tape edges are adjacent and disposed along a diagonal, as illustrated by lines 264 in FIG. 11D. An arrowhead-shaped piece of adhesive tape can then be placed over the folded and adhered tape ends and the corner, such as of the shape outlined as 266 in FIG. 11D, covering the corner and adhering also to the supporting surface.

Figure 12:
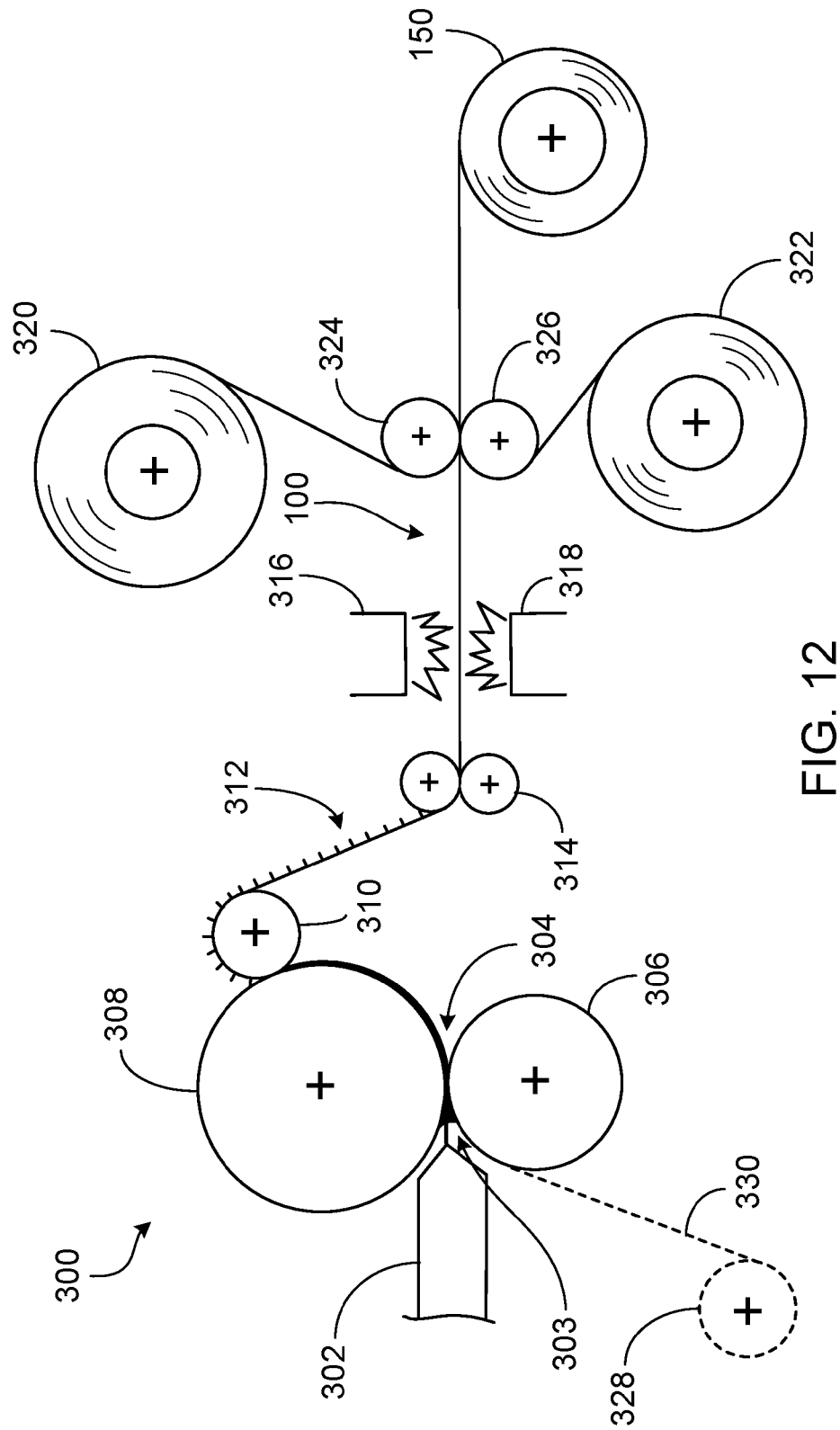
FIG. 12 is a diagrammatic plan view of an example apparatus and process for forming a sealing tape.

FIG. 12 illustrates an example apparatus 300 and method for forming one or more of the sealing tapes described above. As shown, apparatus 300 includes an extruder 302 which provides a continuous sheet of molten thermoplastic resin 303 to a nip 304 formed between a pressure roll 306 and a counter-rotating mold roll 308. The surface of the mold roll defines miniature blind-ended cavities that can be appropriately shaped to form the field of fastener elements on the first edge width of the base film. Pressure in the nip causes the thermoplastic resin 303 to enter the cavities of mold roll 308 to form the fastener elements, while excess resin remains about the periphery of the mold roll and is molded between the rolls to form a supporting sheet-form base. In some examples, this sheet-form base can provide the base film of the sealing tape. In other examples, the base film 330 is fed from a feed roll 328 into the nip 304 and the excess resin is pressed against the base film with sufficient force to bond the fastener element field to the base film. In any event, the thermoplastic resin is cooled as it proceeds along the periphery of the mold roll, solidifying the fastener elements, until it is stripped by a stripping roll 310 as an intermediate fastening product 312. The intermediate fastening product is a continuous strip featuring a field of fastening elements integrally formed on a first edge width of a flexible sheet-form base. Further details regarding preform molding are described by U.S. Pat. Nos. 4,775,310, 6,802, 260 and 6,163,939, the entire disclosures of which are hereby incorporated by reference.

In some embodiments, the mold roll 308 includes a face-to-face assembly of thin, circular plates or rings (not shown) that are, for example, about 0.07 mm to about 6.35 mm thick (e.g., about 0.15 mm or about 0.10 mm), some having cutouts in their periphery defining mold cavities and others having solid circumferences, serving to close the open sides of the mold cavities and serve as spacers, defining the spacing between adjacent rows in an array of preform structures. A fully "built up" mold roll may include ring stacks that may contain, for example, from about 50 to 1000 or more individual rings. Further details regarding mold tooling are described by Fisher, U.S. Pat. No. 4,775,310.

A pair of tensioning rollers 314 pull the intermediate fastening product 312 to first and second adhesive applicators 316, 318. The first adhesive applicator 316 deposits a first adhesive layer along an edge width on the upper face of the base film opposite the field of molded fastener elements, leaving a bare fold region between the first adhesive layer and the fastening elements. The second adhesive applicator 318 deposits a second adhesive layer on the lower face of the base film along an edge width directly under the fastener element field. First and second applicator rolls 324, 326 apply removable release liners to the first and second adhesive layers carried of the resulting sealing tape 100. As described above, in some examples, the release liners may include a pattern of apertures that leave discrete portions of the adhesive exposed. The sealing tape 100 carrying the release liners is collected as a tape roll 150.

While the above method describes forming the field of fastener elements on the film, the sealing tape may also be formed by first molding a strip of fastener tape on the apparatus of FIG. 12, slitting it to a desired length, and then bonding it to a surface of a carrier film.

While a number of examples have been described for illustration purposes, the foregoing description is not intended to limit the scope of the invention, which is defined by the scope of the appended claims. There are and will be other examples and modifications within the scope of the following claims.

What is claimed is:

1. A sealing tape comprising:
a flexible base film of greater length than width and impervious to moisture, the film having opposite broad faces including an upper face and a lower face;
a field of discrete touch fastener elements disposed on the upper face of the film, each touch fastener element shaped to releasably snag fibers, the field of discrete touch fasteners extending along a first edge width of the upper face, leaving a second edge width of the upper face void of touch fastener elements;
a first layer of adhesive disposed on the second edge width of the upper face of the film and spaced from the field of touch fastener elements, such that the upper face of the film has a longitudinal fold region spaced from edges of the film, between the field of fastener elements and the first layer of adhesive; and
a second layer of adhesive disposed on the lower face of the film, directly under the field of touch fastener elements.
wherein the sealing tape is configured as a roll of tape having overlapping courses.

2. The sealing tape of claim 1, wherein the second layer of adhesive directly underlies at least 80% of the field of fastener elements.

3. The sealing tape of claim 1, further comprising a removable release liner covering the second layer of adhesive.

4. The sealing tape of claim 1, wherein the first and second edge widths each comprises more than 40% of an overall width of the upper face of the base film.

5. The sealing tape of claim 1, wherein the upper face of the film and the discrete touch fastener elements comprise respective portions of a single, contiguous mass of a resin.

6. The sealing tape of claim 1, further comprising a removable release liner covering the first layer of adhesive.

7. The sealing tape of claim 1, wherein the first layer of adhesive comprises pressure-sensitive adhesive.

8. The sealing tape of claim 1, wherein the field of discrete fastener elements is continuous along the length of the film.

9. The sealing tape of claim 1, wherein the discrete fastener elements comprises stems extending from a base to a distal head having two oppositely directed crooks.

10. The sealing tape of claim 1, wherein the discrete fastener elements are less than 0.4 mm in height.

11. A method of attaching and sealing an edge of a moisture barrier membrane having opposite surfaces including a fibrous surface and a non-fibrous surface, the method comprising:
securing a moisture-impermeable sealing tape to a surface to which the edge of the moisture barrier membrane is to be attached, the tape positioned to underlie and extend along the edge of the membrane when attached and having a first edge width in which a field of discrete touch fastener elements is disposed, and a second edge width carrying a layer of adhesive;
engaging the fibrous surface of the moisture barrier membrane against the field of touch fastener elements, such that the moisture barrier membrane overlaps the first edge width of the tape; and then
folding the sealing tape over the edge of the moisture barrier membrane, such that the adhesive engages the non-fibrous surface of the moisture barrier membrane.

12. The method of claim 11, wherein engaging the fibrous surface of the moisture barrier membrane against the field of touch fastener elements leaves the second edge width exposed beyond the edge of the moisture barrier membrane.

13. The method of claim 11, further comprising, after engaging the fibrous surface of the moisture barrier membrane against the field of touch fastener elements and before folding the sealing tape over the edge of the moisture barrier membrane, trimming the moisture barrier membrane to have an edge disposed between the first and second edge widths of the sealing tape.

14. The method of claim 11, wherein securing the sealing tape to a surface to which the edge of the moisture barrier membrane is to be attached comprises securing the sealing tape to a non-fibrous surface of another moisture barrier membrane.

15. The method of claim 11, wherein securing the sealing tape to a surface to which the edge of the moisture barrier membrane is to be attached comprises adhering the sealing tape to the surface to which the edge of the moisture barrier membrane is to be attached.

16. The method of claim 15, wherein securing the sealing tape to a surface to which the edge of the moisture barrier membrane is to be attached further comprises removing a release liner from a back side of the sealing tape to expose a second layer of adhesive.

17. The method of claim 11, further comprising, after engaging the fibrous surface of the moisture barrier membrane against the field of touch fastener elements and before folding the sealing tape over the edge of the moisture barrier membrane, repositioning the moisture barrier membrane by disengaging the fibrous surface from the touch fastener elements and then reengaging the touch fastener elements with the fibrous surface in a different position.

18. The method of claim 11, further comprising, after engaging the fibrous surface of the moisture barrier membrane against the field of touch fastener elements and before folding the sealing tape over the edge of the moisture barrier membrane, removing a release liner from the second edge width of the sealing tape to expose the layer of adhesive.

* * * * *

UNITED STATES PATENT AND TRADEMARK OFFICE
CERTIFICATE OF CORRECTION

PATENT NO. : 9,958,070 B2  
APPLICATION NO. : 14/974353  
DATED : May 1, 2018  
INVENTOR(S) : Frederic Cornu, Carlos Sáez Comet and Fabio Billa Longo Page 1 of 1

It is certified that error appears in the above-identified patent and that said Letters Patent is hereby corrected as shown below:

On the Title Page

Abstract, Column 2, Line 4, delete "tap" and insert -- tape --

In the Claims

Claim 1, Column 9, Line 59, delete "elements." and insert -- elements, --

Signed and Sealed this  
Eighteenth Day of September, 2018

Andrei Iancu  
*Director of the United States Patent and Trademark Office*